United States Patent
Phanco

(10) Patent No.: US 12,239,051 B1
(45) Date of Patent: Mar. 4, 2025

(54) BATTERY MOUNTING SYSTEM FOR ELECTRIC ZERO-TURN MOWER

(71) Applicant: Hydro-Gear Limited Partnership, Sullivan, IL (US)

(72) Inventor: Eric S. Phanco, Plainfield, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 329 days.

(21) Appl. No.: 18/046,417

(22) Filed: Oct. 13, 2022

Related U.S. Application Data

(60) Provisional application No. 63/262,542, filed on Oct. 14, 2021.

(51) Int. Cl.
   *A01D 69/02* (2006.01)
   *A01D 34/412* (2006.01)
   (Continued)

(52) U.S. Cl.
   CPC .......... *A01D 69/02* (2013.01); *A01D 34/412* (2013.01); *B60K 1/02* (2013.01); *B60K 1/04* (2013.01);
   (Continued)

(58) Field of Classification Search
   CPC .. A01D 69/02; A01D 34/412; A01D 2101/00; B60K 1/02; B60K 1/04; B60K 26/02; B60K 2026/025; H01M 50/204; H01M 50/244; H01M 50/249; H01M 50/256; H01M 50/296; H01M 4/5825;
   (Continued)

(56) References Cited

U.S. PATENT DOCUMENTS

| 6,688,089 B2 | 2/2004 | Velke et al. |
| 7,934,576 B2 | 5/2011 | Munksoe |

(Continued)

FOREIGN PATENT DOCUMENTS

| EP | 3871913 | 9/2021 |
| IN | 389680 | 2/2014 |

(Continued)

OTHER PUBLICATIONS

FusionCore QuikSwap Batteries, Information Sheet, Downloaded from https://www.gravely.com/en-us/power-equipment/electric/pro-turn-ev_on Oct. 28, 2020, 6 pp.

(Continued)

*Primary Examiner* — Erez Gurari
(74) *Attorney, Agent, or Firm* — Neal, Gerber & Eisenberg LLP

(57) ABSTRACT

A battery assembly is disposed on a mowing vehicle having at least two electric drive assemblies. The battery assembly includes a plurality of battery packs joined together, where two of the battery packs are structurally connected to the vehicle frame and at least one other battery pack is structurally connected only to the first two battery packs to form a structural support for the vehicle. A fourth battery pack may be connected to and disposed below one of the other battery packs, and may be located between the two electric drive assemblies. A portion of the battery assembly may be located between an operator seat and a portion of the drive assemblies.

20 Claims, 9 Drawing Sheets

(51) Int. Cl.
*B60K 1/02* (2006.01)
*B60K 1/04* (2019.01)
*B60K 26/02* (2006.01)
*H01M 50/204* (2021.01)
*H01M 50/244* (2021.01)
*H01M 50/249* (2021.01)
*H01M 50/256* (2021.01)
*H01M 50/296* (2021.01)
*A01D 101/00* (2006.01)
*H01M 4/02* (2006.01)
*H01M 4/58* (2010.01)
*H01M 10/0525* (2010.01)

(52) U.S. Cl.
CPC ............ *B60K 26/02* (2013.01); *H01M 50/204* (2021.01); *H01M 50/244* (2021.01); *H01M 50/249* (2021.01); *H01M 50/256* (2021.01); *H01M 50/296* (2021.01); *A01D 2101/00* (2013.01); *B60K 2026/025* (2013.01); *B60Y 2200/223* (2013.01); *B60Y 2200/91* (2013.01); *H01M 2004/028* (2013.01); *H01M 4/5825* (2013.01); *H01M 10/0525* (2013.01); *H01M 2220/20* (2013.01)

(58) Field of Classification Search
CPC ....... H01M 10/0525; H01M 2004/028; H01M 2220/20; B60Y 2200/223; B60Y 2200/91
See application file for complete search history.

(56) References Cited

U.S. PATENT DOCUMENTS

| | | | |
|---|---|---|---|
| 8,163,420 B2 | 4/2012 | Okada et al. | |
| 8,240,414 B2 | 8/2012 | Sasahara et al. | |
| 8,511,412 B2 | 8/2013 | Kawaguchi et al. | |
| 8,833,499 B2 | 9/2014 | Rawlinson | |
| 10,130,037 B2 | 11/2018 | Conrad et al. | |
| 10,967,720 B2 | 4/2021 | Caliskan et al. | |
| 11,032,973 B2 | 6/2021 | Conrad et al. | |
| 11,258,114 B2 | 2/2022 | Zeiler et al. | |
| 11,258,218 B2 | 2/2022 | Uemura et al. | |
| 2012/0175177 A1 | 7/2012 | Lee et al. | |
| 2020/0315095 A1* | 10/2020 | Liu | A01D 34/008 |
| 2022/0408648 A1 | 12/2022 | Yang et al. | |
| 2022/0408649 A1 | 12/2022 | Yang et al. | |
| 2022/0410762 A1 | 12/2022 | Yang et al. | |
| 2023/0231436 A1* | 7/2023 | Schuller-Rach | H02K 7/085 56/17.5 |
| 2023/0329143 A1* | 10/2023 | Siebert | B60W 50/082 |
| 2023/0389476 A1* | 12/2023 | Liu | A01D 34/64 |
| 2024/0025367 A1* | 1/2024 | Wershing | B60R 21/13 |
| 2024/0172587 A1* | 5/2024 | Zeiler | A01D 34/78 |
| 2024/0180070 A1* | 6/2024 | Van Thiel | A01D 69/02 |
| 2024/0313690 A1* | 9/2024 | Bachman | A01D 34/66 |
| 2024/0341224 A1* | 10/2024 | Patzer | A01D 34/008 |

FOREIGN PATENT DOCUMENTS

| | | |
|---|---|---|
| WO | WO2021190612 | 9/2021 |
| WO | WO2022028399 | 2/2022 |
| WO | WO2022262762 | 12/2022 |

OTHER PUBLICATIONS

Krüger, et al., "Avoiding structural redundancies between the vehicle body and the battery housing based on a functional integration approach," Automotive and Engine Technology, 2022, 12 pp.

Lienert, et al., "Next step for EVs: Design batteries to strengthen car, extend range," Reuters, Jul. 2021, 3 pp.

Notable New Products of 2019, Brochure, Diesel Progress, Dec. 2019, 3 pp.

PB-48-75 Industrial Grade Battery, Information Sheet downloaded from https://www.lithiumpowerinc.com/48-75.html on Jul. 19, 2021, 5 pp.

Symbasys SwatPack Modular Battery, Information Sheet, 2021, 3 pp.

Taylor-Smith, "Massless Energy Storage: The Next Step in Battery Technology," AZoCleantech, Apr. 8, 2021, 4 pp.

Vanguard, 48 Volt Lithium-Ion Commerical Battery, Operator's Manual, Downloaded from Vanguardpower.com on Mar. 25, 2022, 6 pp.

* cited by examiner

BATTERY MOUNTING SYSTEM FOR ELECTRIC ZERO-TURN MOWER

CROSS-REFERENCE

This application claims the benefit of U.S. Provisional Patent Application No. 63/262,542 filed on Oct. 14, 2021. The contents of the prior application is incorporated herein by reference in its entirety.

BACKGROUND

This application is related to battery mounting and battery positioning for an electrically powered zero turn radius (ZT) vehicle. In particular, mounting the battery or batteries such that they form a structural component of the frame of the ZT vehicle, and positioning the battery or batteries with respect to the rear wheels of the ZT vehicle in order to optimize the center of gravity of the ZT vehicle.

SUMMARY

The present invention comprises a battery mounting system for an electric zero-turn vehicle, such as a lawn mower. Such a lawn mowing vehicle may include traction drive units (e.g., electric wheel motors or electric transaxles) to power output wheels of the vehicle individually. Such a vehicle may also include cutting blades (or another output) that may be powered by one or more separate electric motors. The battery capacity required to power the output wheels and the cutting blades or other output can result in a need for relatively heavy batteries. The weight and positioning of the batteries can substantially influence the location of the vehicle center of gravity. The present disclosure provides example embodiments that use the weight, positioning and orientation of the batteries to advantageously affect the vehicle center of gravity thereby enabling the zero-turn aspect of the vehicle to perform more efficiently and effectively. Furthermore, example embodiments of the present disclosure enable the batteries to be connected to each other and mounted to the frame of the vehicle in order to provide structural support.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
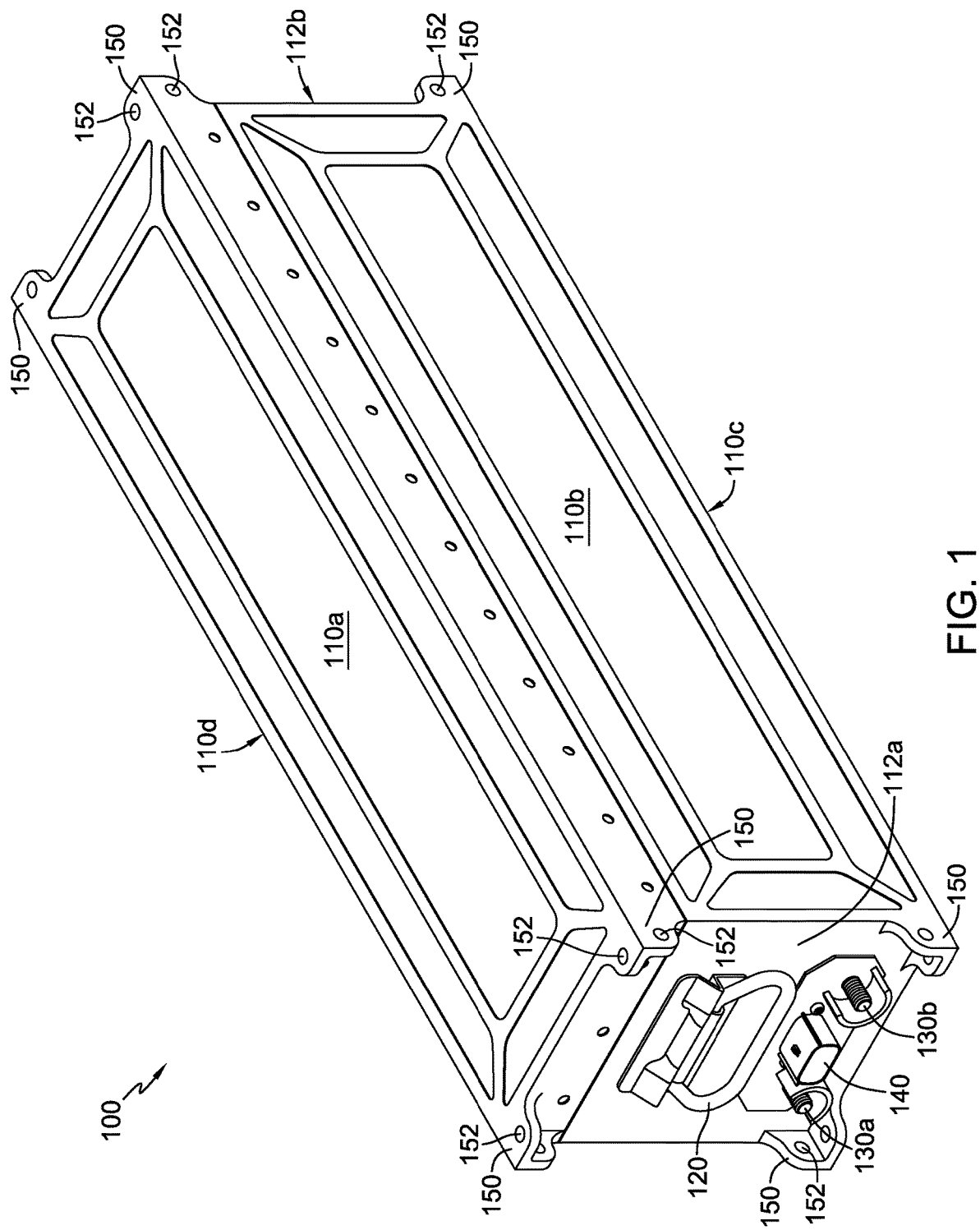
FIG. 1 is a perspective view of a first battery pack configuration in accordance with the principles of the present invention.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a clearer description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

The battery assembly disclosed herein, comprising one or more battery packs, may be used in vehicles such as zero turn mowers, zero turn lawn and garden tractors, and other similar electrically powered vehicles. Two such example vehicles are the ZT lawn mowing vehicle 200 depicted in FIGS. 2, 3, and 4, and the ZT lawn mowing vehicle 300 depicted in FIG. 7. The ZT vehicle 200 includes, among other things, a frame 210, a mowing deck 220 comprising at least one electric blade-driving motor 220a, a pair of front casters 222L and 222R, and a traction drive apparatus 230 comprising electric drive units 232L and 232R coupled to rear wheels 234L and 234R, respectively. The ZT vehicle 300 may be similar or identical to the ZT vehicle 200 in one or more ways but may have one or more different components or features which are detailed below.

Figure 2:
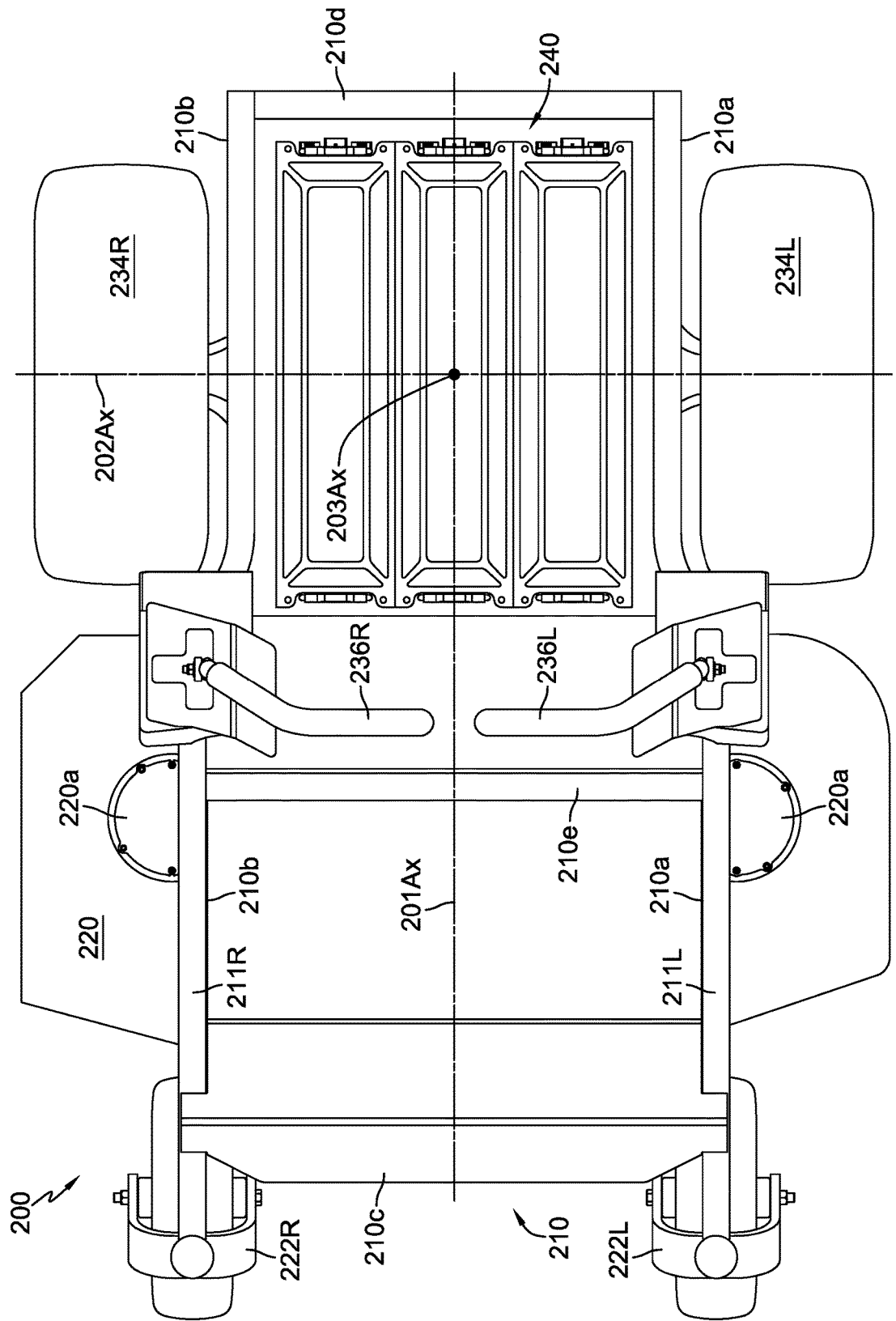
FIG. 2 is a top plan view of a ZT vehicle having three battery packs of FIG. 1 installed, in accordance with the principles of the present invention.
Figure 3:
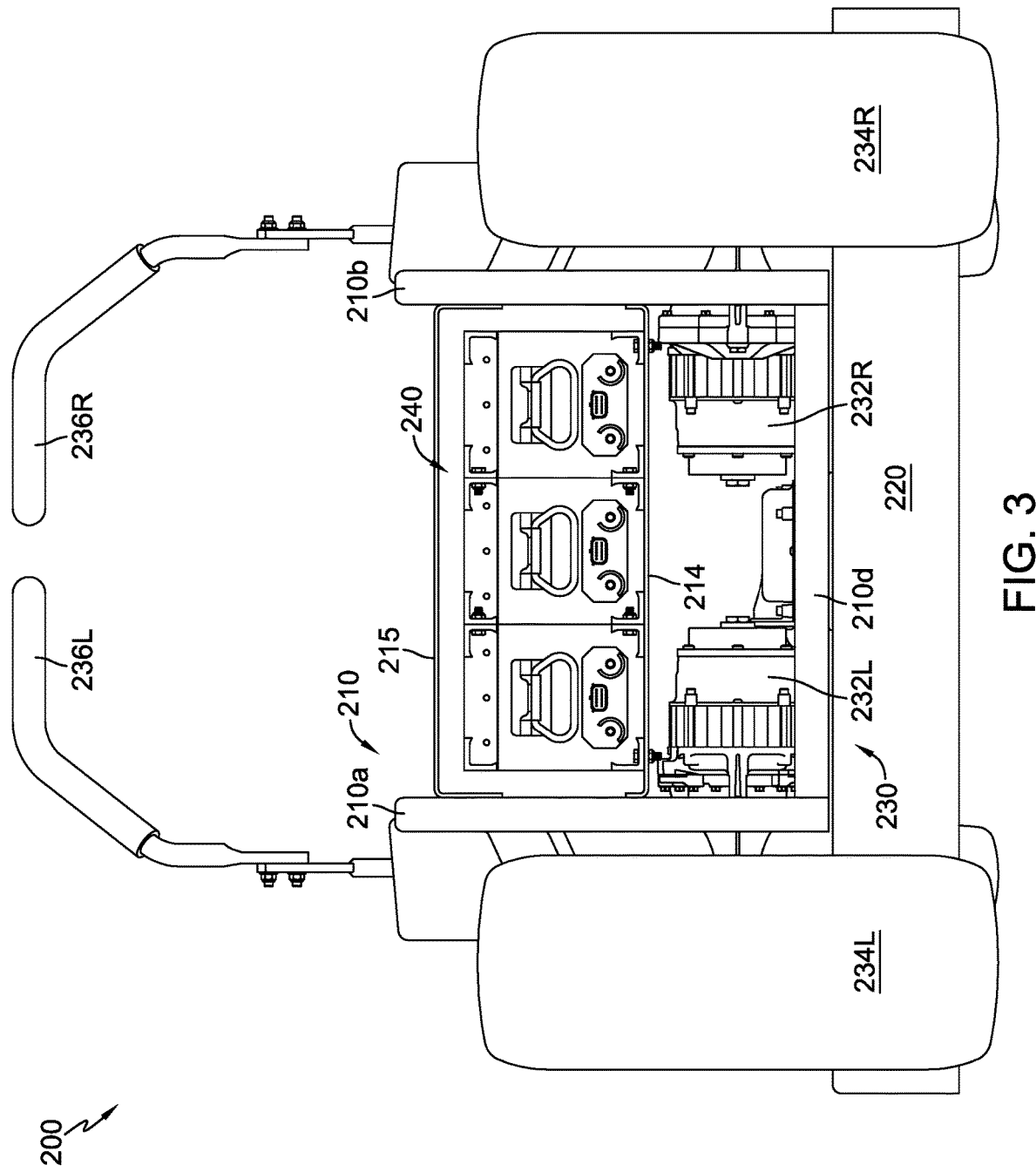
FIG. 3 is a rear elevational view of the vehicle of FIG. 2.
Figure 4:
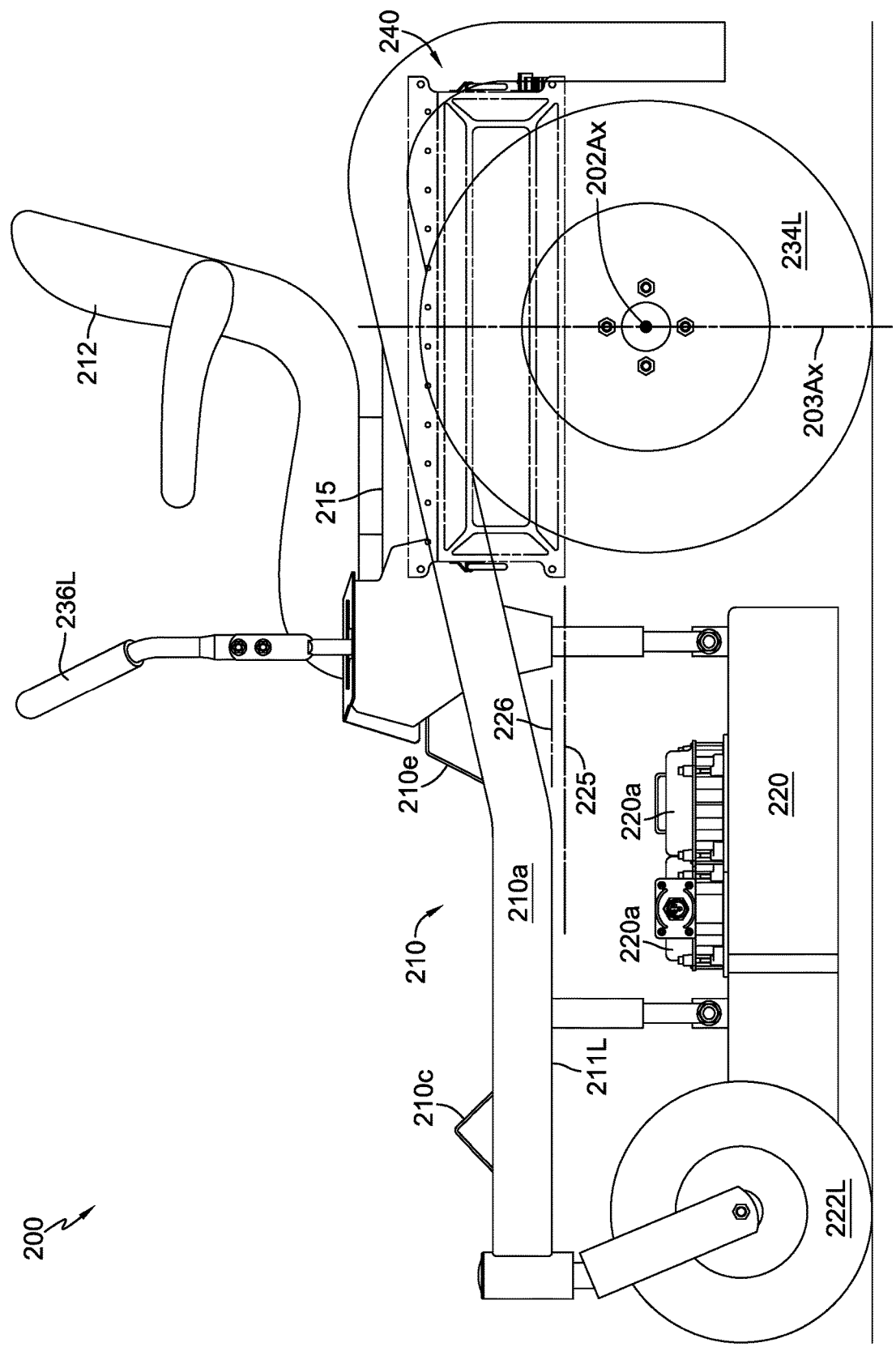
FIG. 4 is a side elevational view of the vehicle of FIG. 2.

In the illustrated embodiment of FIGS. 2, 3, and 4, the frame 210 of the vehicle 200 includes first and second longitudinal side frame members 210a and 210b, front crossmember 210c, rear crossmember 210d, and one or more intermediate crossmembers 210e. Additionally, battery support member 214 supports battery assembly 240 and seat support member 215 supports operator seat 212. Each of the first and second side frame members 210a and 210b includes a forward horizontal rail portion 211L and 211R, respectively, under which a substantial portion of the mowing deck 220 is suspended. Each of the forward horizontal rail portions 211L and 211R has a top surface (not labeled) and a bottom surface (not labeled). Similarly, the battery support member 214 and the seat support member 215 each have a top surface (not labeled) and a bottom surface (not labeled).

Figure 7:
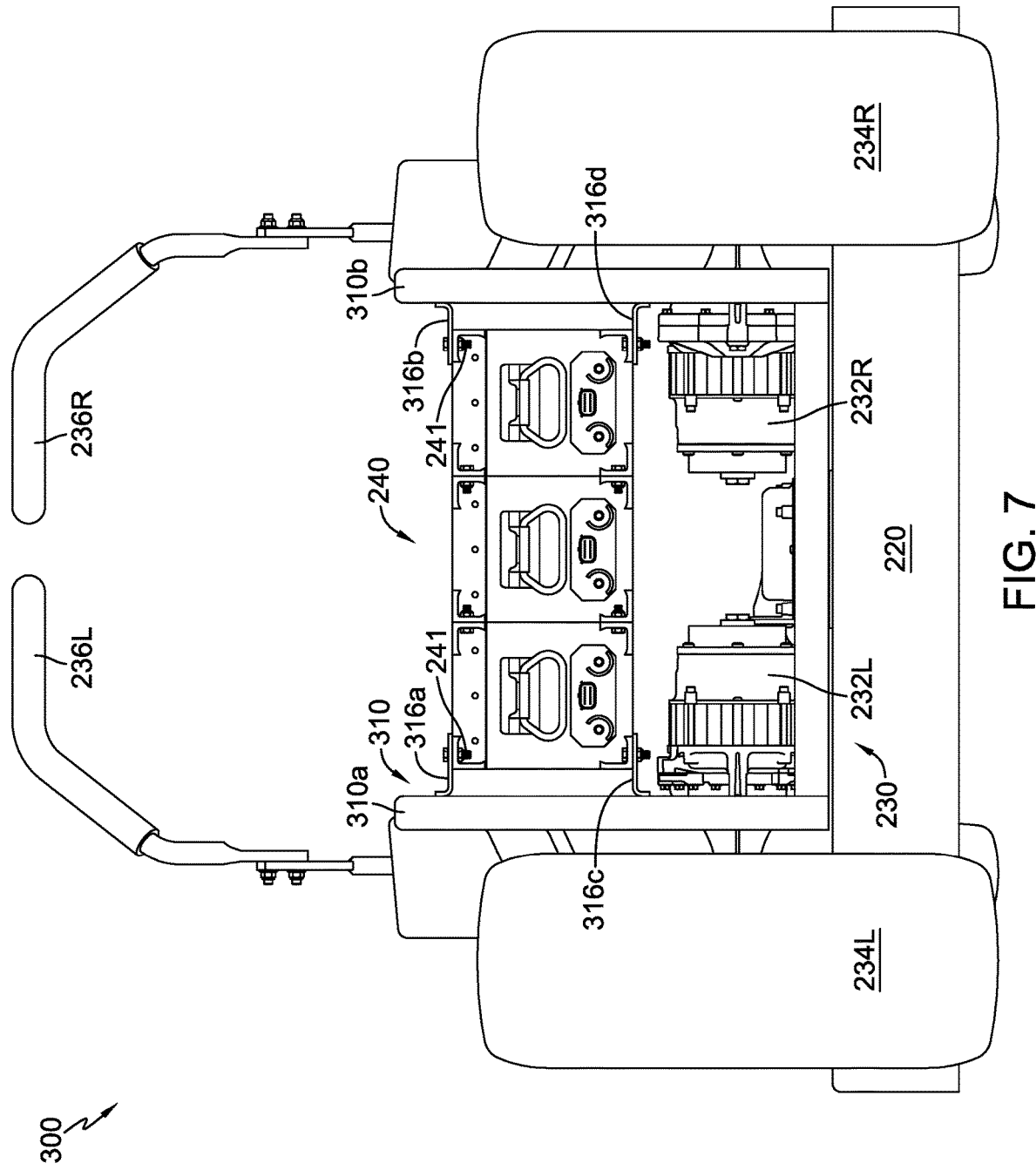
FIG. 7 is a rear elevational view of a ZT vehicle having three battery packs of FIG. 1 installed and acting as a structural support member, in accordance with principles of the present invention.

In the illustrated embodiment of FIG. 7, the ZT vehicle 300 includes first and second longitudinal side frame members 310a and 310b. In contrast to ZT vehicle 200, the battery support member 214 of the ZT vehicle 200 is replaced with the combination of the battery assembly 240 comprising three battery packs 100 structurally connected together via fasteners 241, and structurally connected to the first and second side frame members 310a and 310b via support brackets 316a-d and additional fasteners 241. Brackets 316c and 316d may comprise rails extending along the longitudinal axis of the vehicle to provide further support for the weight of the battery assembly 240. This group of fasteners 241 may or may not be all the same size or type of fastener. A seat support member, such as seat support member 215, may be used in ZT vehicle 300 but is omitted in the FIG. 7 illustration. In some vehicle configurations, such as remote controlled or robotic vehicles, the operator seat 212 may be optional, removable, or omitted entirely. A vehicle 300 not having an operator seat or an operator on board may benefit from a lower center of gravity and improved stability.

The rear wheels 234L and 234R of both vehicles 200 and 300 are driven by electric drive units 232L and 232R, respectively. The rear wheels 234L and 234R share a common first axis of rotation 202Ax. Each electric drive unit 232L and 232R is configured to separately control the speed and rotational direction of one of the two driven wheels 234L or 234R. This enables the vehicles 200 and 300 to be capable of zero turn rotation about a generally vertical second axis of rotation 203Ax, wherein the second axis of rotation 203Ax is perpendicular to and passes through the first axis of rotation 202Ax at a midpoint between the rear wheels 234L and 234R. Each electric drive unit 232L and 232R may comprise an electric transaxle (shown) or other single wheel drive unit.

Vehicles 200 and 300 may also each include a suitable controller (not shown) which communicates with and controls the operation of the drive units 232L and 232R. The controller receives input from a user of the vehicle via an operator control system, which comprises one or more control levers, control sticks, or lap bars 236L and 236R. Other user input devices are contemplated as well. In response to the input via the operator control system, the controller can cause the drive units 232L and 232R to turn forward, backward, or remain stationary. Independent control of the drive units 232L and 232R, along with the movement of the casters 222L and 222R, enables the ZT vehicle to rotate or pivot about the generally vertical zero turn axis of rotation 203Ax that intersects the rotational axis 202Ax of the rear wheels, thereby providing zero turn capability.

In order to power the drive units 232L and 232R, as well as one or more electric motors 220a to drive cutting blades of the mowing deck 220 (or other suitable output), the vehicles 200 and 300 each include a battery assembly 240. The battery assembly 240 may include one or more battery packs 100.

Referring to FIG. 1, each battery pack 100 includes a rectangular body comprising first, second, third, and fourth elongated side panels 110a-d, and first and second end panels 112a and 112b.

The elongated side panels 110a-d may be flat, may have ridges or other raised elements, or may have other features. The elongated panels and/or features of the elongated panels may provide structural support and may enable easier alignment with the frame of the mower and/or with other battery packs in order to fit together. Each elongated side panel 110a-d may be substantially the same as the others or may be different. In some examples, the first elongated panel 110a and the third elongated panel 110c may be identical, and the second elongated panel 110b and the fourth elongated panel 110d may be identical, but these two sets may be different from each other. For instance, the first elongated panel 110a and the third elongated panel 110c may be narrower than the second elongated panel 110b and the fourth elongated panel 110d, such that the battery pack 100 has a rectangular cross section (e.g., as represented in FIG. 1). In the depicted embodiment of FIG. 1, side panel 110a is formed as a lid or similar structure, which may be secured to side panels 110b and 110d, and to end panels 112a and 112b, by standard means. Other shapes and sizes and configurations of elongated panels are contemplated as well.

Each of the end panels 112a and 112b includes a handle 120. Further, one or both of the end panels 112a and 112b of each battery pack 100 includes two electrical connectors 130a and 130b, and a data connector 140. The electrical connections of electrical connectors 130a and 130b may include ring connections, and may enable two or more battery packs to be electrically connected in series or in parallel, and to be electrically connected to the control system of the vehicle 200. The data connector 140 also enables one or more battery packs to be connected to each other and to the control system of the vehicle 200.

Each battery pack 100 also includes a plurality of integrally formed mounting angles or brackets 150. In the illustrated embodiment, the battery pack 100 includes eight mounting brackets 150. Each mounting bracket 150 extends outwardly from the corner of the battery pack, such that an L-shaped bracket is formed approximately matching the profile of the battery pack corners. The mounting brackets 150 extend beyond the end panels 112a and 112b in a direction parallel to a longitudinal axis of the battery pack 100, as shown in FIG. 1.

Figure 5:
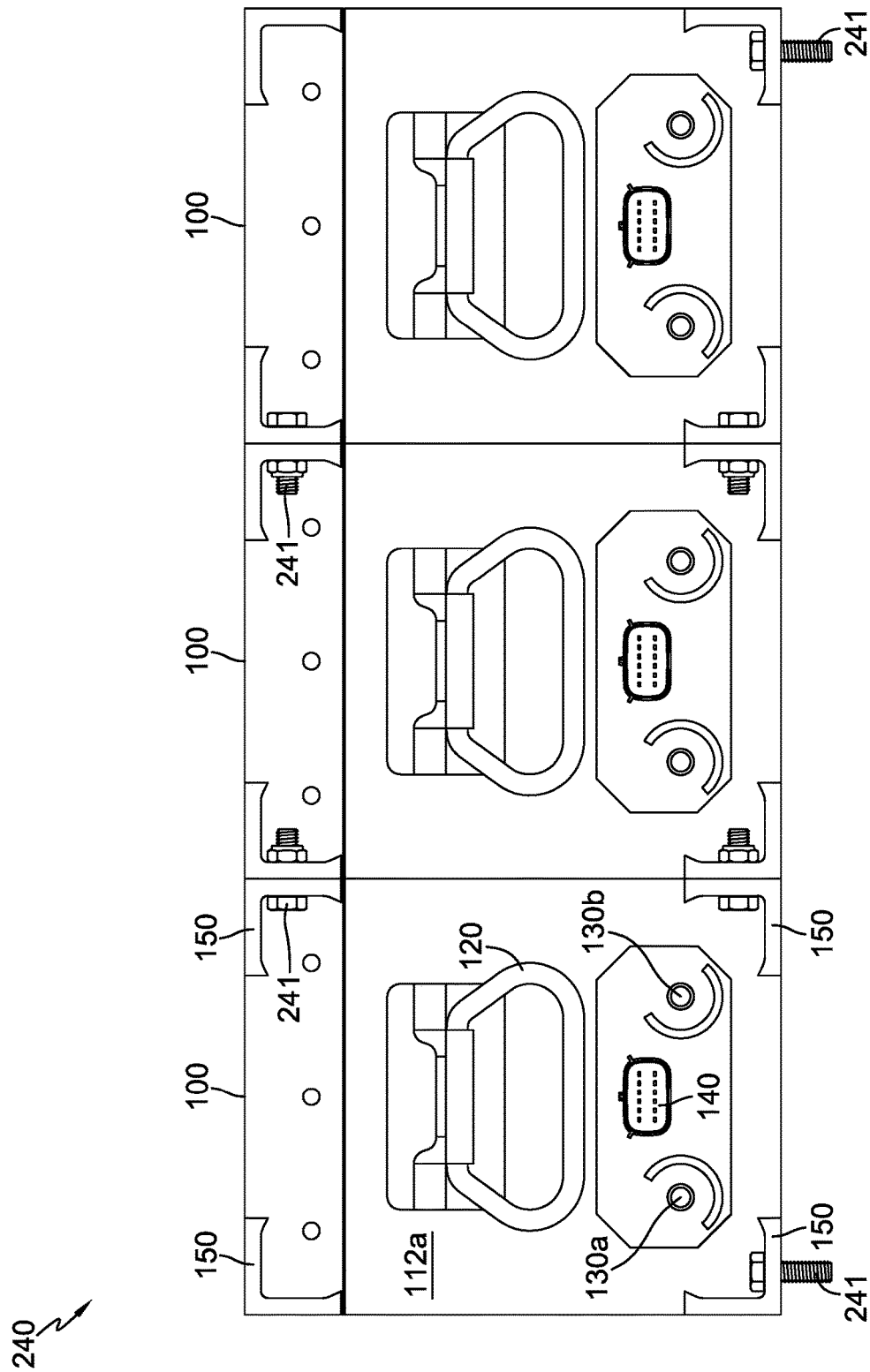
FIG. 5 is a rear elevational view of three battery packs of FIG. 1, each in a first orientation and attached to each other.
Figure 6:
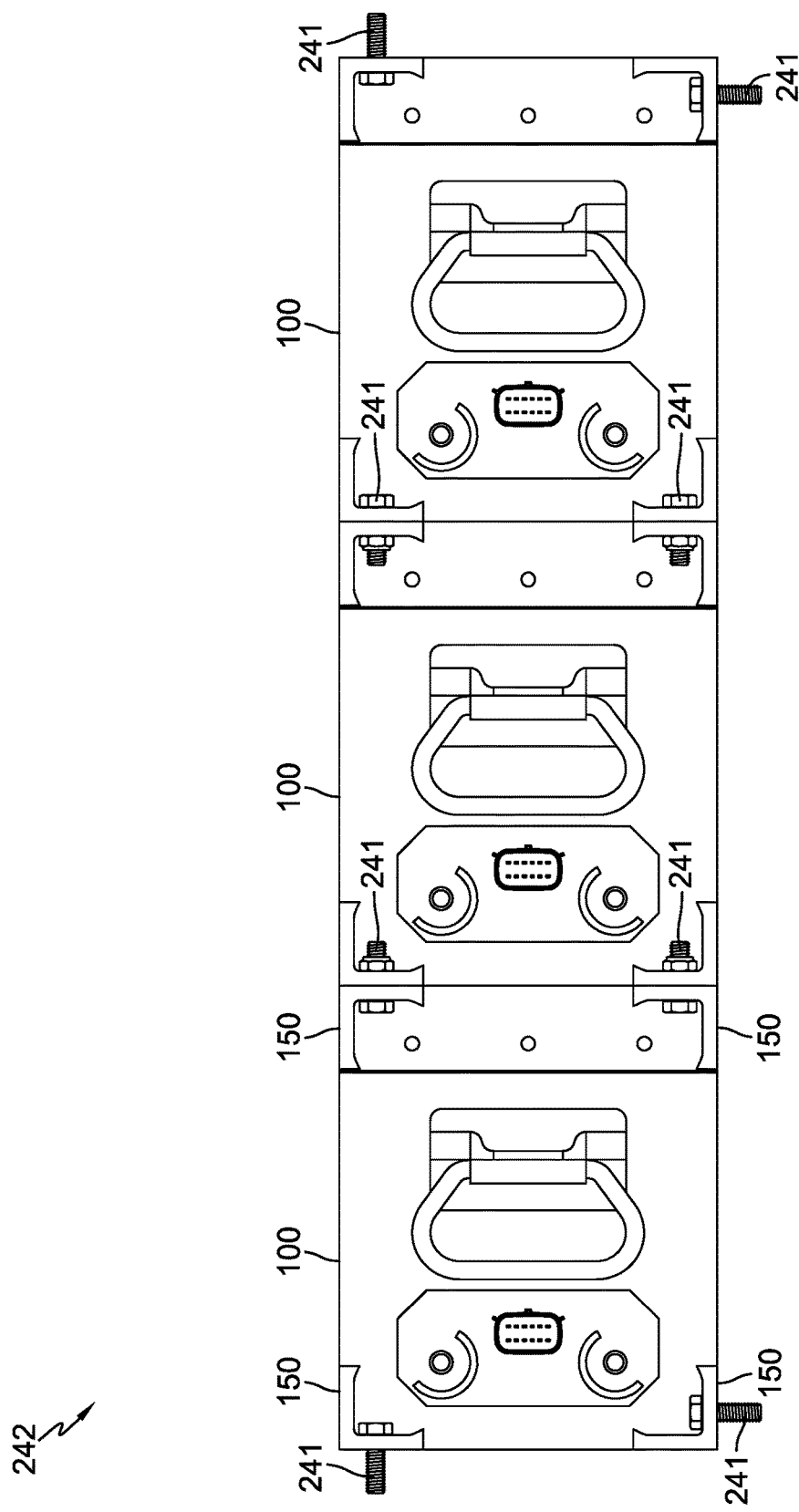
FIG. 6 is a rear elevational view of three battery packs of FIG. 1, each in a second orientation and attached to each other.

Each mounting bracket 150 may be similar or identical to the others. Mounting brackets 150 include mounting apertures 152 that are located such that when two or more battery packs are positioned next to each other, the mounting apertures 152 are aligned and the battery packs can be connected to each other. Battery packs 100 are designed to be connected together in more than one orientation. For example, FIG. 5 illustrates three battery packs connected together (battery assembly 240) in a first orientation which may be described as three upright battery packs. FIG. 6 illustrates three battery packs connected together (battery assembly 242) in a second orientation, which may be described as three sideways battery packs. These arrangements of the battery packs could be formed as a subassembly prior to installation into a vehicle.

It should be appreciated that while each of the orientations shown in FIGS. 5 and 6 includes three battery packs 100 connected together, other numbers of battery packs may be used instead, such as a single battery pack, two battery packs, or four or more battery packs. Additionally, the orientations of the battery packs may be the same, or they may be different from each other. For example, a first battery pack may be upright, and a second battery pack may be upside down or flipped with respect to the first battery pack. Location of the electrical and data connections on the end panels 112a and/or 112b enables multiple orientations of the battery packs 100 relative to one another by simply rotating the battery packs about their longitudinal axes to align mounting brackets 150 as desired. The battery packs may be oriented or positioned in any suitable way provided the mounting apertures 152 are aligned with each other. It should be noted that elongated or additional apertures 152 may be used on the mounting brackets 150 to further enable orientation versatility and ease of assembly. Mounting brackets 150 may be sized to accommodate elongated or additional apertures.

In some examples, such as the vehicle 200 shown in FIGS. 3 and 4, the frame 210 of the vehicle 200 may include first and second side frame members 210a and 210b. Each side frame member 210a and 210b may have a complex shape, with a flat front section comprising forward frame rail portions 211L and 211R, respectively that are generally parallel with the ground, and an angled or curved rear section that extends beyond the wheels 234L and 234R. It should be appreciated that the frame 310 of vehicle 300 shown in FIG. 7, including side frame members 310a and/or 310b, may be similar or identical to the frame 210 of vehicle 200 shown in FIGS. 2, 3, and 4. In other vehicle configurations, the first and second side frame members may have a less complex shape or may simply be straight rails extending approximately from the front of the vehicle to the rear of the vehicle and positioned generally parallel to the longitudinal axis of the vehicle.

In other examples, such as the example shown in FIG. 7, the battery assembly 240, including battery pack(s) 100, may act as a structural crossmember of the vehicle frame 310. For example, FIG. 7 illustrates a battery assembly 240 comprising three battery packs 100 connected to each other via fasteners 241 and to the side frame members 310a and 310b via support brackets 316a-d by means of additional fasteners 241. In essence, the structural support provided by the battery support member 214 of the frame 210 of vehicle 200 has been replaced by the combination of the battery assembly 240 (including structural fasteners 241) and support brackets 316a-d. It should be appreciated that while four support brackets 316a-d are shown on the rear side of the vehicle 300 in FIG. 7, there may be an additional set of four support brackets (not shown) that connect to the corresponding mounting brackets of the battery packs on the front side or the brackets 316a-d may simply extend longitudinally to engage mounting brackets at both the front and rear of the battery assembly 240. It should also be noted that although orienting battery electrical connections toward the rear of the vehicle may improve serviceability in the vehicle embodiments shown, battery electrical connections may be oriented toward the front or rear of the vehicle, or even toward a side of the vehicle.

As shown in the Figures, the battery packs 100 may be attached to each other via fasteners 241, and may be attached to the frame 210 and/or support brackets 316a-d via additional fasteners 241. As in the previous embodiment, this group of fasteners 241 may or may not be all the same size or type of fastener. Also, though nuts and bolts (or screws) are shown, it should be appreciated that other suitable structural fasteners or fastening mechanisms may be used instead.

The battery packs may be positioned both horizontally and vertically such that the overall center of gravity of the combined vehicle and battery packs is optimized. Referring to FIGS. 2 and 3, for example, vehicle 200 includes a fixed mounting plate 214 onto which the battery packs 100 are secured. The mounting assembly may be configured to support any number of battery packs (e.g., 1, 2, 3, 4 or more) while maintaining a desirable center of gravity position of the battery pack(s). For example, the battery pack center of gravity may be centered left-to-right with respect to a plane encompassing the longitudinal axis 201Ax of the vehicle 200 and second axis of rotation 203Ax, and centered front-to-back with respect to a plane encompassing both first axis of rotation 202Ax and second axis of rotation 203Ax. The mounting assembly may be configured such that when one pack, two packs, three packs, and/or any other number of packs are included, each number of battery packs used still results in a combined battery pack center of gravity that is centered left-to-right with respect to the longitudinal axis of the vehicle.

As illustrated in, e.g., FIGS. 3 and 4, the battery assembly 240 (including battery packs 100) may be mounted or attached to the frame of vehicle 200 in an area of vehicle 200 such that at least a portion of battery assembly 240 is below at least a portion of vehicle operator seat 212 and above at least a portion of the drive units 232L and 232R. The vertical positioning of the battery packs 100 affects the position of the overall center of gravity of the vehicle. By lowering the position of the battery packs, the vehicle center of gravity is also lowered, thereby improving the stability of the vehicle and reducing the risk of vehicle rollover. As depicted in FIG. 4, for example, a first plane 225 formed by the lowest surface of battery assembly 240 is lower (i.e., closer to the ground) than a second plane 226 formed by the lowest surface of frame members 210a, 210b, such that the battery assembly 240 is lower (closer to the ground) than the primary portions of the frame.

Improvement in location of the center of gravity improves hillside stability, particularly when traversing a slope. Since the driven wheels (rear wheels 234L and 234R) also control steering, any weight in front of the driven wheels will tend to rotate the vehicle downhill while driving along the hillside. Therefore, in typical ZT mowing vehicles having an ICE (internal combustion engine), the ICE is often placed behind the rotational axis of the rear wheels. Similarly, the batteries can be positioned to balance the torque around the drive wheels to improve straight driving along a hillside.

In some examples, the basic vehicle and operator (without battery packs included) may have a horizontally offset center of gravity (front-to-back, side-to-side, or both). In this case, the battery packs may be positioned in a complementary offset position, in order to counteract the vehicle center of gravity horizontal offset thereby moving the overall combined center of gravity more toward the longitudinal centerline of the vehicle or the rear wheels rotational axis, or both.

The relatively high weight ratio of the battery packs to the vehicle itself, combined with the positioning of the battery packs relative to the vehicle enables the center of gravity of the combined vehicle and battery packs to be positioned toward the rear wheels zero turn axis, which improves functionality of the zero turn aspect of the vehicle. Specifically, moving the center of gravity closer to the zero turn axis of the rear driven wheels allows these wheels to turn more easily and have more balanced traction.

Figure 8:
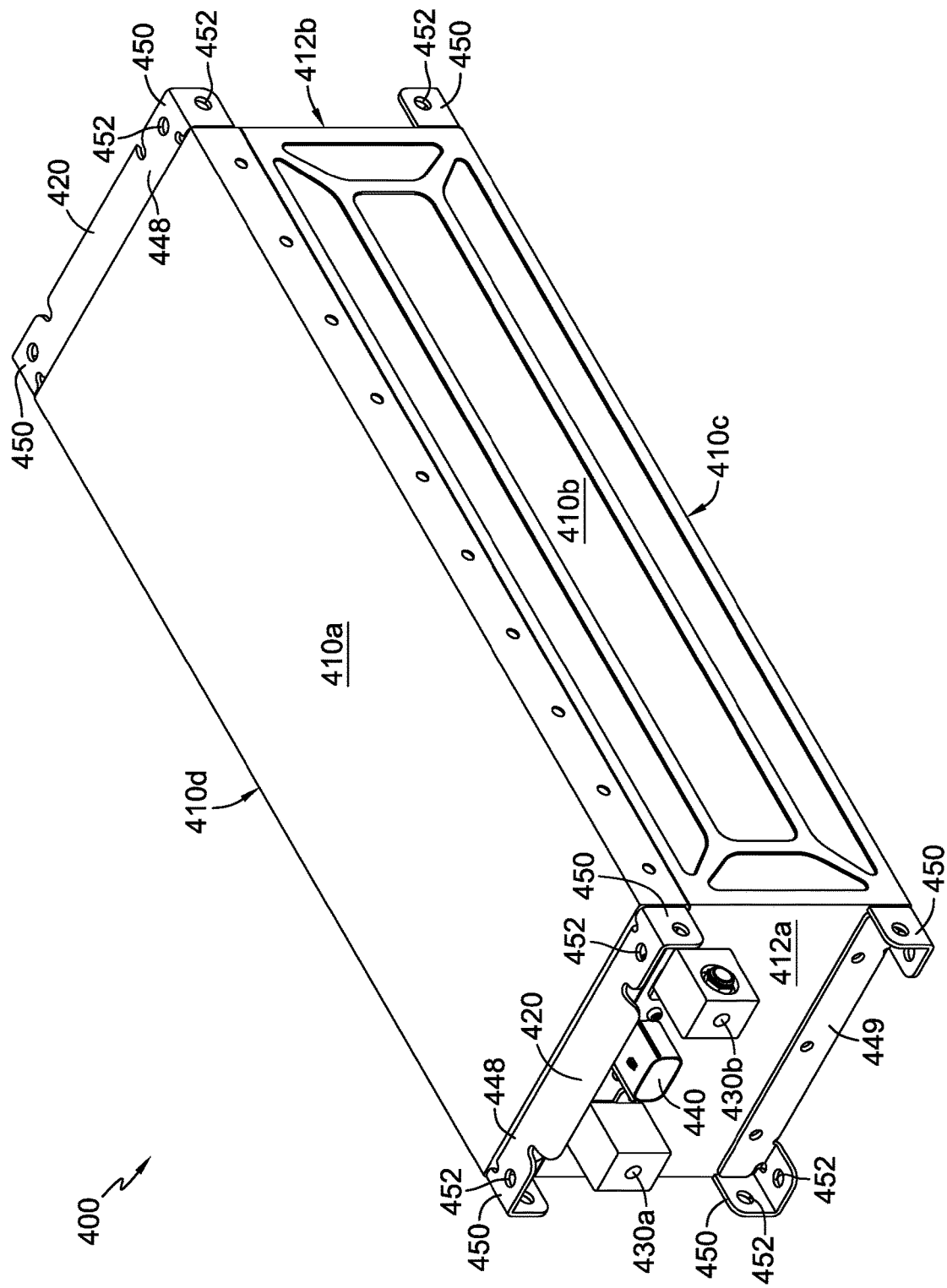
FIG. 8 is a perspective view of a second battery pack configuration in accordance with the principles of the present invention.

An alternate embodiment of a battery pack 400 is shown in FIG. 8. Similar to battery pack 100, battery pack 400 includes a rectangular body comprising first, second, third, and fourth elongated side panels 410a-d, and first and second end panels 412a and 412b.

Figure 9:
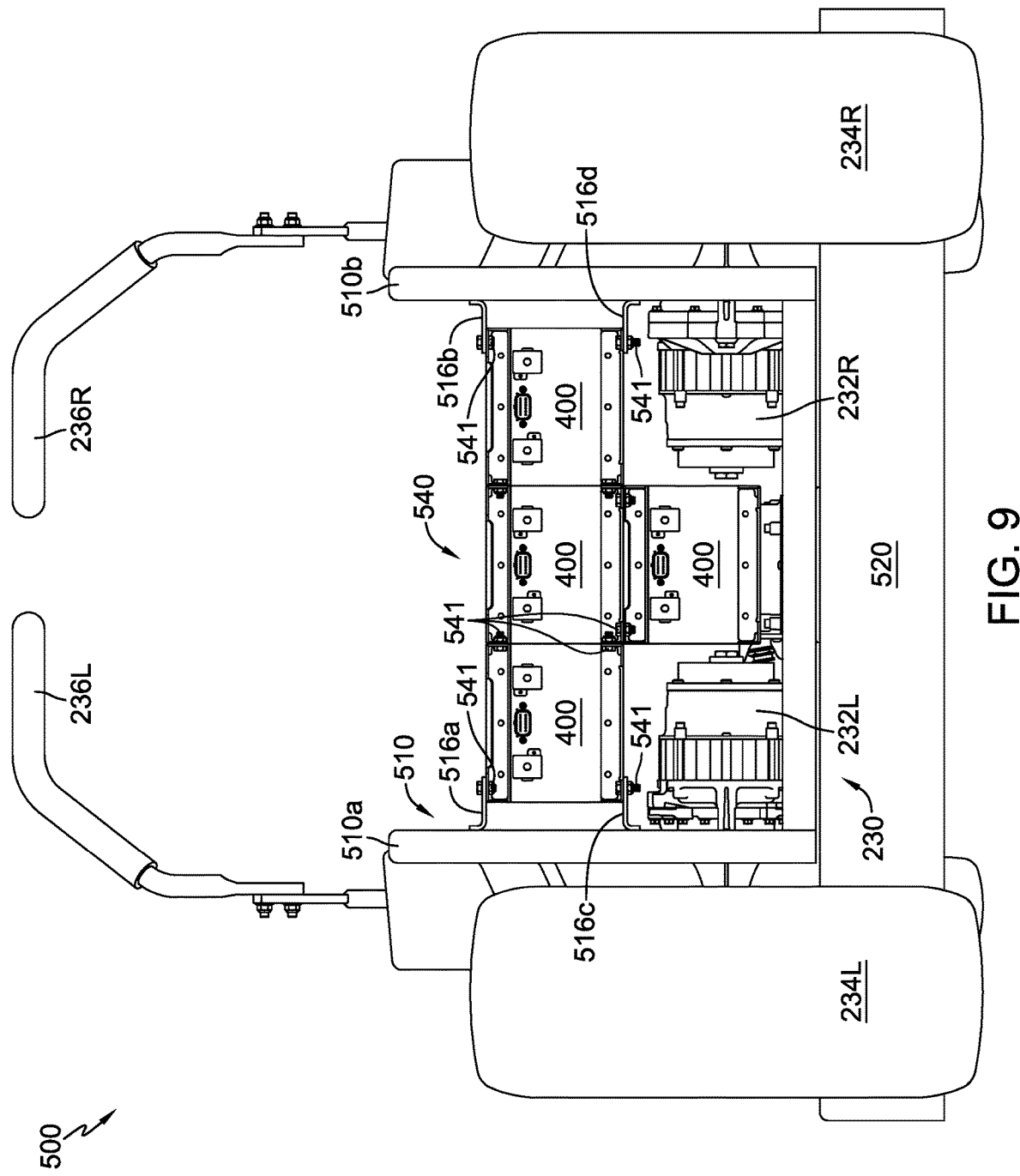
FIG. 9 is a rear elevational view of a ZT vehicle having four battery packs and acting as a structural support member, in accordance with principles of the present invention.

In battery pack 400, an upper mounting bracket 448 and a lower mounting bracket 449 are attached to each of the end panels 412a and 412b. Each of the upper mounting brackets 448 includes an integrally formed handle 420. The lower mounting brackets 449 may or may not include a handle (shown without handle). Each of the upper and lower mounting brackets 448 and 449 includes a pair of integrally formed mounting angles 450. Each mounting angle 450 includes two mounting apertures 452 for joining battery packs together or for mounting to a vehicle frame as illustrated in FIG. 9. One or both of the end panels 412a and 412b of each battery pack 400 includes two electrical connectors 430a and 430b, and a data connector 440. Electrical connectors 430a and 430b are illustrated as a wire insert type, with each connector having a set screw for securing an inserted wire conductor, but other types of connectors may be used.

Shown in FIG. 9 is a rear view of a vehicle 500 similar to the vehicle 300 shown in FIG. 7, but having a wider wheelbase and a wider mowing deck 520. Vehicle 500 includes a battery assembly 540 comprising four battery packs 400 that may act as a structural crossmember of the vehicle frame 510. The four battery packs 400 of battery assembly 540 are connected to each other via fasteners 541 and to the side frame members 510a and 510b via support brackets 516a-d by means of additional fasteners 541. This group of fasteners 541 may or may not be all the same size or type of fastener. In this T-shaped battery arrangement, three batteries are attached side-by-side and a fourth battery is located below and attached to the central battery of the three side-by-side batteries, such that it is positioned between the electric drive units 232L and 232R, thereby lowering the center of gravity and increasing the battery power of vehicle 500. As shown in, e.g., FIGS. 8 and 9, electrical connectors 430a, 430b and data connector 440 are located on the first end panel 412a. Location of these connectors on one of the first end panel 412a or second end panel 412b, and not on one of the elongated side panels 410a-d, enables the orientation shown and increases flexibility of mounting positions of the plurality of battery packs 400.

In an embodiment, the batteries disclosed herein may be comprised of a lithium-ion type battery, specifically one having a lithium iron phosphate (LiFePO4) cathode, and containing minimal or no metallic lithium in the anode. The battery packs disclosed herein may consist of dual voltage power sources. For example, a high voltage, high current function may be used to propel the vehicle and power the blades or other work function. The lower voltage power source, or auxiliary power source, may be used to power computers, sensors, indicators, or other low-power draw devices on the vehicle. Both voltage sources may share a common ground.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A lawn mowing vehicle having a longitudinal axis extending from a front of the vehicle to a rear of the vehicle, the lawn mowing vehicle comprising:
   a frame;
   two driven wheels disposed opposite one another on the vehicle, wherein the two driven wheels each rotate on a common first axis of rotation;
   two drive units disposed on the vehicle, each drive unit separately controlling the speed and rotational direction of one of the two driven wheels, wherein the vehicle is capable of zero turn rotation about a second axis of rotation, wherein the second axis of rotation is perpendicular to and passes through the first axis of rotation;
   an operator control system disposed on the vehicle for controlling the two drive units; and
   a battery assembly disposed on the vehicle and comprising a plurality of battery packs joined together, wherein two of the battery packs are structurally connected to the frame and at least one of the battery packs is structurally connected only to other battery packs of the battery assembly, whereby the battery assembly forms a structural support for the frame.

2. The lawn mowing vehicle of claim 1, further comprising a seat for an operator, wherein at least a portion of the battery assembly is disposed between at least a portion of the seat and at least a portion of both of the two drive units in a vertical direction.

3. The lawn mowing vehicle of claim 1, wherein each of the battery packs comprises a rectangular body having first, second, third, and fourth elongated side panels, and each side panel is connected to a first end panel and a second end panel, a first electrical connector, a second electrical connector and a data connector, wherein for each of the battery packs, the respective first electrical connector, second electrical connector and data connector are each located on one of the first end panel or the second end panel.

4. The lawn mowing vehicle of claim 1, wherein the frame comprises a first frame member on a first side of the vehicle and a second frame member on a second side of the vehicle, the first and second frame members both extending generally parallel to the longitudinal axis of the vehicle, and wherein the battery assembly comprises a first battery pack structurally connected to the first frame member, a second battery pack structurally connected to the second frame member, a third battery pack disposed between and structurally connected to both the first battery pack and the second battery pack, and a fourth battery pack disposed below and structurally connected to the third battery pack.

5. The lawn mowing vehicle of claim 4, wherein the fourth battery pack is disposed between the two drive units.

6. The lawn mowing vehicle of claim 1, wherein each battery pack further comprises a plurality of mounting brackets integrally formed thereon, for connection to another battery pack or to the frame.

7. The lawn mowing vehicle of claim 1, wherein each battery pack comprises a rectangular body comprising first, second, third, and fourth elongated side panels, a first end panel connected to one end of each of the first, second, third, and fourth elongated side panels and a second end panel connected to an opposite end of each of the first, second, third, and fourth elongated side panels.

8. The lawn mowing vehicle of claim 7, further comprising a first plurality of mounting brackets located at the first end panel, and a second plurality of mounting brackets located at the second end panel, wherein the first plurality of mounting brackets comprises at least one first integrated handle and the second plurality of mounting brackets comprises at least one second integrated handle.

9. A lawn mowing vehicle having a longitudinal axis extending from a front of the vehicle to a rear of the vehicle, the lawn mowing vehicle comprising:
   a frame comprising first and second side frame members disposed on opposite sides of the vehicle and both extending generally parallel to the longitudinal axis of the vehicle;
   at least one blade motor driving at least one blade;
   two driven wheels disposed opposite one another on the vehicle, wherein the two driven wheels each rotate on a common first axis of rotation;
   two electric drive units disposed on the vehicle, each electric drive unit separately controlling the speed and rotational direction of one of the two driven wheels, wherein the vehicle is capable of zero turn rotation about a second axis of rotation, wherein the second axis of rotation is perpendicular to and passes through the first axis of rotation; and a battery assembly powering the at least one blade motor and the two electric drive units, the battery assembly comprising at least a first battery pack, a second battery pack and a third battery pack, wherein the first battery pack is connected to the first side frame member, the second battery pack is connected to the second side frame member, and the third battery pack is disposed between and connected to both the first and second battery packs, whereby the battery assembly forms a structural crossmember of the frame.

10. The lawn mowing vehicle of claim 9, further comprising a first plurality of support brackets attached to the first side frame member for connecting the first battery pack to the first side frame member and a second plurality of support brackets attached to the second side frame member for connecting the second battery pack to the second side frame member.

11. The lawn mowing vehicle of claim 10, wherein each of the battery packs further comprises a plurality of mounting brackets integrally formed thereon, each of the plurality of mounting brackets being sized and shaped for connection to a corresponding mounting bracket of another battery pack of the battery assembly, or for connection to a respective one of the first plurality of support brackets of the first side frame member or the second plurality of support brackets of the second side frame member.

12. The lawn mowing vehicle of claim 9, further comprising a fourth battery pack structurally connected to the third battery pack.

13. The lawn mowing vehicle of claim 12, wherein the fourth battery pack is disposed below the third battery pack with respect to the ground.

14. The lawn mowing vehicle of claim 13, wherein the fourth battery pack is disposed between the two electric drive units.

15. The lawn mowing vehicle of claim 9, wherein each of the battery packs comprises:
a rectangular body having first, second, third, and fourth elongated side panels;
a first end panel connected to one end of each of the first, second, third, and fourth elongated side panels and a second end panel connected to an opposite end of each of the first, second, third, and fourth elongated side panels;
a first electrical connector, a second electrical connector and a data connector, wherein for each of the battery packs, the respective first electrical connector, second electrical connector and data connector are each located on one of the first end panel or the second end panel.

16. The lawn mowing vehicle of claim 15, wherein each of the battery packs further comprises a first plurality of mounting brackets located at the first end panel, and a second plurality of mounting brackets located at the second end panel.

17. The lawn mowing vehicle of claim 16, wherein the first plurality of mounting brackets of each of the battery packs comprises at least one first integrated handle and the second plurality of mounting brackets of each of the battery packs comprises at least one second integrated handle.

18. The lawn mowing vehicle of claim 9, further comprising a seat for an operator, wherein at least a portion of the battery assembly is disposed between at least a portion of the seat and at least a portion of the two electric drive units in a vertical direction.

19. The lawn mowing vehicle of claim 9, wherein each of the battery packs comprises a lithium-ion type battery having a lithium iron phosphate (LiFePO4) cathode, and minimal or no metallic lithium in an anode.

20. A lawn mowing vehicle having a longitudinal axis extending from a front of the vehicle to a rear of the vehicle, the lawn mowing vehicle comprising:
a frame comprising at least one frame member having a forward rail portion extending horizontally and generally parallel to the longitudinal axis of the vehicle, the forward rail portion having a top surface and a bottom surface;
at least one blade motor driving at least one blade;
two driven wheels disposed opposite one another on the vehicle, wherein the two driven wheels each rotate on a common first axis of rotation;
two drive units disposed on the vehicle, each drive unit separately controlling the speed and rotational direction of one of the two driven wheels, wherein the vehicle is capable of zero turn rotation about a second axis of rotation, wherein the second axis of rotation is perpendicular to and passes through the first axis of rotation;
an operator control system disposed on the vehicle for controlling the two drive units;
a battery assembly for powering the at least one blade motor and the two drive units, the battery assembly comprising a plurality of battery packs secured together and having a top and a bottom, wherein the bottom of the battery assembly relative to level ground is positioned lower than the bottom surface of the forward rail portion relative to level ground, and wherein the battery assembly extends in a direction along the longitudinal axis of the vehicle such that the weight of the battery assembly is equally distributed on opposite sides of a first plane encompassing the first axis of rotation and perpendicular to the longitudinal axis of the vehicle and equally distributed on opposite sides of a second plane perpendicular to the first axis of rotation and encompassing the longitudinal axis of the vehicle; and
a seat for an operator, wherein at least a portion of the battery assembly and at least a portion of the two drive units are disposed directly beneath at least a portion of the seat, whereby the portion of the battery assembly is disposed between the portion of the seat and the portion of the two drive units in a vertical direction.

\* \* \* \* \*